United States Patent
Dalal et al.

(10) Patent No.: US 6,522,430 B1
(45) Date of Patent: Feb. 18, 2003

(54) QUANTIFICATION OF MOTION QUALITY EFFECT ON IMAGE QUALITY

(75) Inventors: Edul N. Dalal, Webster, NY (US); D. Rene Rasmussen, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,184

(22) Filed: Nov. 29, 1999

(51) Int. Cl.[7] .................................. H04N 1/00
(52) U.S. Cl. ................. 358/406; 355/308; 358/496; 358/497; 382/312; 382/141
(58) Field of Search ................ 358/296, 496–497, 358/406, 504; 355/208; 382/141, 312

(56) References Cited

U.S. PATENT DOCUMENTS

| | | | |
|---|---|---|---|
| 3,665,419 A | * 5/1972 | Hartmann et al. | 340/825.22 |
| 4,071,911 A | 1/1978 | Mazur | 364/900 |
| 4,086,434 A | 4/1978 | Bocchi | 179/2 AM |
| 4,583,834 A | 4/1986 | Seko et al. | 355/14 |
| 4,731,861 A | * 3/1988 | Blanton et al. | 382/174 |
| 5,038,319 A | 8/1991 | Carter et al. | 364/900 |
| 5,057,866 A | 10/1991 | Hill, Jr. et al. | 355/200 |
| 5,084,875 A | 1/1992 | Weinberger et al. | 371/291 |
| 5,365,310 A | 11/1994 | Jenkins et al. | 355/201 |
| 5,510,876 A | 4/1996 | Hayashi et al. | 355/202 |
| 5,510,896 A | 4/1996 | Wafler | 358/296 |
| 5,612,902 A | 3/1997 | Stokes | 364/526 |
| 5,619,307 A | 4/1997 | Machino et al. | 399/11 |
| 5,642,202 A | 6/1997 | Williams et al. | 358/406 |
| 5,680,541 A | 10/1997 | Kurosu et al. | 395/183.02 |
| 5,694,528 A | 12/1997 | Hube | 395/113 |
| 5,748,221 A | 5/1998 | Castelli et al. | 347/232 |
| 5,884,118 A | 3/1999 | Mestha et al. | 399/15 |
| 6,023,525 A | 2/2000 | Cass | 382/162 |
| 6,023,595 A | 2/2000 | Suzuki et al. | 399/31 |

FOREIGN PATENT DOCUMENTS

EP     0 854 632 A2    7/1998    ............ H04N/1/32

OTHER PUBLICATIONS

Remote Diagnostics Systems, Paul F. Morgan, Xerox Disclosure Journal, vol. 3, No. 3, May/Jun. 1978, pp. 191–192x.
Event–based architecture for real–time fault diagnosis, Real Time Fault Monitoring of Industrial Processes, A.D. Pouliezos & G.S. Staverakakis, Kluwer Academic Publishers, 1994, pp. 284–287.

(List continued on next page.)

*Primary Examiner*—Leo Boudreau
*Assistant Examiner*—Tom Y. Lu
(74) *Attorney, Agent, or Firm*—Oliff & Berridge, PLC

(57) ABSTRACT

An image quality analysis system is provided that allows highly accurate measurements of motion quality defects. The motion quality analysis process relies only on relative measurements, which can be performed sufficiently accurately with standard input scanners. The technique can therefore be incorporated in the image path of a copier or multi-function printer being tested to allow on-the-fly motion quality correction without the need for expensive, high precision measuring equipment. The system includes one or more digital test patterns provided in hardcopy form for providing one or more hardcopy test images, an input scanner that can scan the hard copy test image to form a digital raster image, and an image quality analysis module that receives information about the position of the digital raster image and produces test results relevant to determination of image quality analysis, particularly motion quality defects. The method is accurate and robust using relatively low-resolution CCD-based flat bed scanners, even in spite of their long-range positional errors.

15 Claims, 8 Drawing Sheets

OTHER PUBLICATIONS

Fault Diagnosis in Dynamic Systems Using Analytical and Knowledge–based Redundancy—A Survey and Some New Results, Paul M. Frank, Automatica, vol. 26, 90 International Federaton of Automatic Control, 1990, pp. 459–474.

Combining Expert System and Analytical Redundancy Concepts for Fault–Tolerant Flight Control, David A. Handelman and Robert F. Stengel, Princeton University, J. Guidance, vol. 12, No. 1, Jan.–Feb. 1989, pp. 39–45.

* cited by examiner

QUANTIFICATION OF MOTION QUALITY EFFECT ON IMAGE QUALITY

BACKGROUND OF THE INVENTION

1. Field of Invention

Motion quality problems can cause serious image quality degradation and therefore customer dissatisfaction. Identifying these problems involves measuring pixel placement accuracy with high precision. Techniques exist to do this, but they are laborious and require sophisticated and very expensive equipment.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another.

One of the causes of image quality degradation is associated with motion quality (MQ) problems. A MQ problem is considered to be any source of inaccurate pixel placement anywhere on the printed page, and can occur in the process and/or transverse directions. This includes sources of positional error such as, for example: mechanical noise due to rough gears and bearings, drive shaft eccentricity, ROS polygon wobble, rough paper transport, etc. It does not include irregular motion that leads to color errors but not positional errors, such as that caused by development donor roll shaft eccentricity.

Because MQ problems can cause serious image quality degradation and therefore customer dissatisfaction, much effort is being expended in identifying and eliminating these problems. Identifying these problems involves measuring pixel placement accuracy with high precision. Techniques exist to do this, but they are laborious and require sophisticated and very expensive equipment.

From an engineering perspective, it would be preferable if the measurements could be done quickly and economically at the test site. However, access to high-precision measuring equipment at the site is difficult to obtain and cost-prohibitive. Moreover, for self-correcting printing systems, it is essential that the measurements can be done locally. Flat bed scanners are affordable and are already widely used for image quality evaluation. Moreover, in the case of a printer-copier or a multifunction device, a flat bed scanner is already part of the system. However, such flat bed scanners typically have unacceptably large positional errors over large distances, such as across a page. As such, one would not expect such a scanner to provide motion quality measurements over a large surface with much precision. Accordingly, there are problems with existing image quality analysis systems, particularly those used in the field.

SUMMARY OF THE INVENTION

There is a need for image output devices, such as printers and copiers, to have systems to identify problems with image quality. Applicants have found that to comprehensively and reliably measure the system performance of a printer or copier, the image quality of the output must be measured. It is most preferable to have such a device self-diagnose these problems.

There also is a need for a relatively inexpensive system and method to determine image quality errors in image output devices while at the site.

One exemplary embodiment of the systems and methods of the invention overcomes such problems by developing powerful diagnosing tools within a digital printer or copier for self-diagnosis and evaluation of image quality. Image quality analysis can be performed to monitor many aspects of the printed output of the printing system. Of particular importance to overall image quality is determination of motion quality errors.

In this embodiment, the system provides: one or more digital (or hardcopy, in the case of a copier) test patterns and one or more pre-printed patterns for providing one or more hardcopy output test images; an input scanner that can scan the hard copy test image to form a digital raster image; and an image quality analysis module that receives information about the position of the digital raster image and produces test results relevant to determination of image quality analysis, particularly motion quality defects.

The input scanner and image quality analysis module may form part of the image output device or may be stand-alone components used to test the device. Optionally, a communication module may be provided that is capable of contacting a service department or a more sophisticated diagnostic module if further analysis or service is necessary, depending on the outcome of the image quality analysis. Alternatively, information relating to motion quality defects may be used by a corrective procedure within the image output device being tested to calibrate the device to correct for detected motion defects.

The systems and methods of the invention allow highly accurate measurements that are robust in determining motion quality errors, even though the scanners being used are relatively low in precision. The motion quality process relies only on relative measurements, which can be performed sufficiently accurate with standard input scanners. The technique can therefore be used for quick, simple, on-site detection and/or correction of motion quality errors in a printer or digital copier without the need for expensive, high precision measuring equipment.

A special test pattern and measurement technique is used to allow highly accurate measurements of motion quality defects in an image output device that prints in monochrome or color. The method has been demonstrated to be accurate and robust using relatively low-resolution CCD-based flatbed scanners, even in spite of their long-range positional errors.

BRIEF DESCRIPTION OF THE DRAWINGS

The invention will be described with reference to the following illustrative drawings, wherein like numerals refer to like elements and wherein.

DETAILED DESCRIPTION OF PREFERRED EMBODIMENTS

Figure 1:
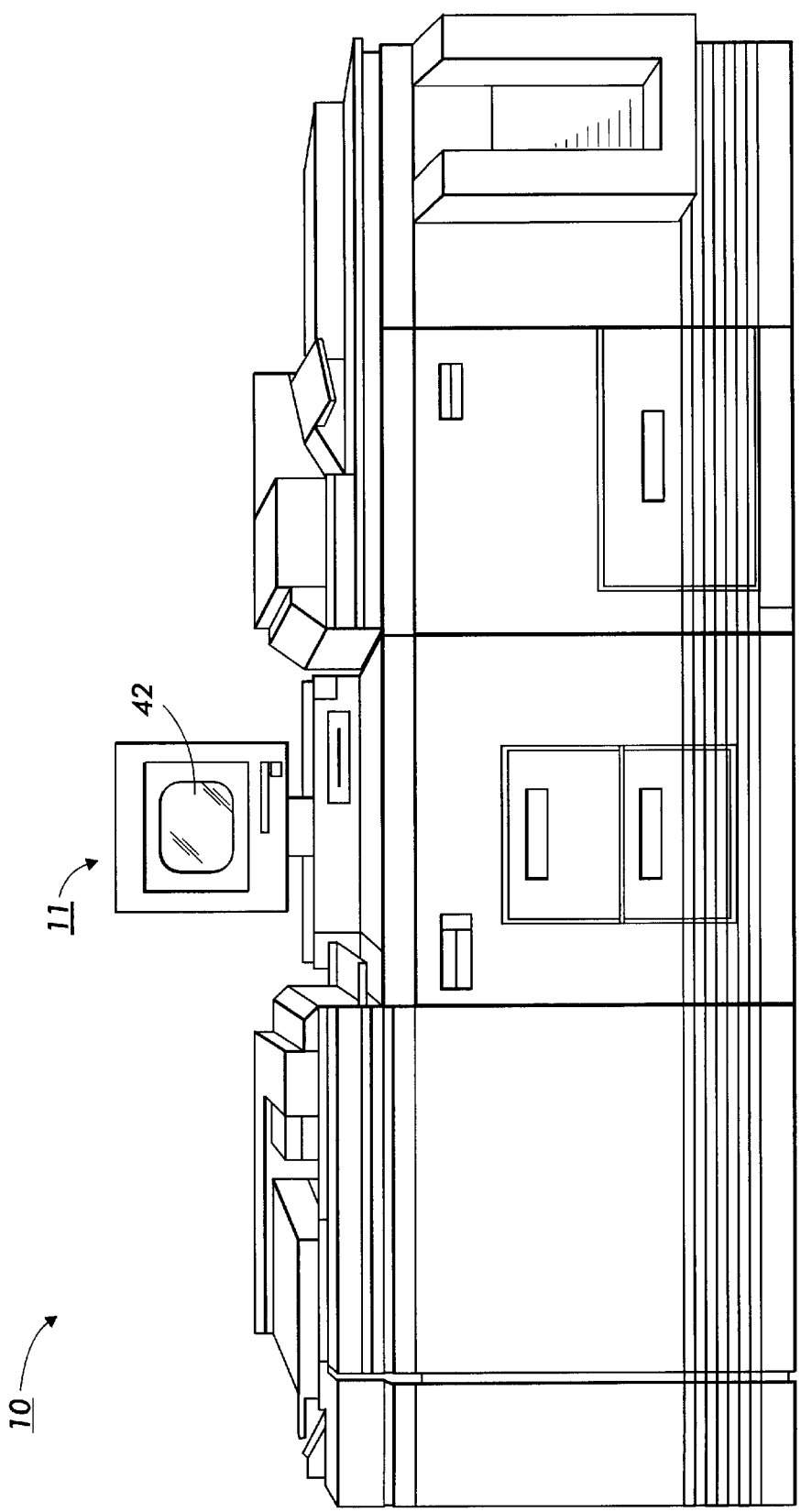
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
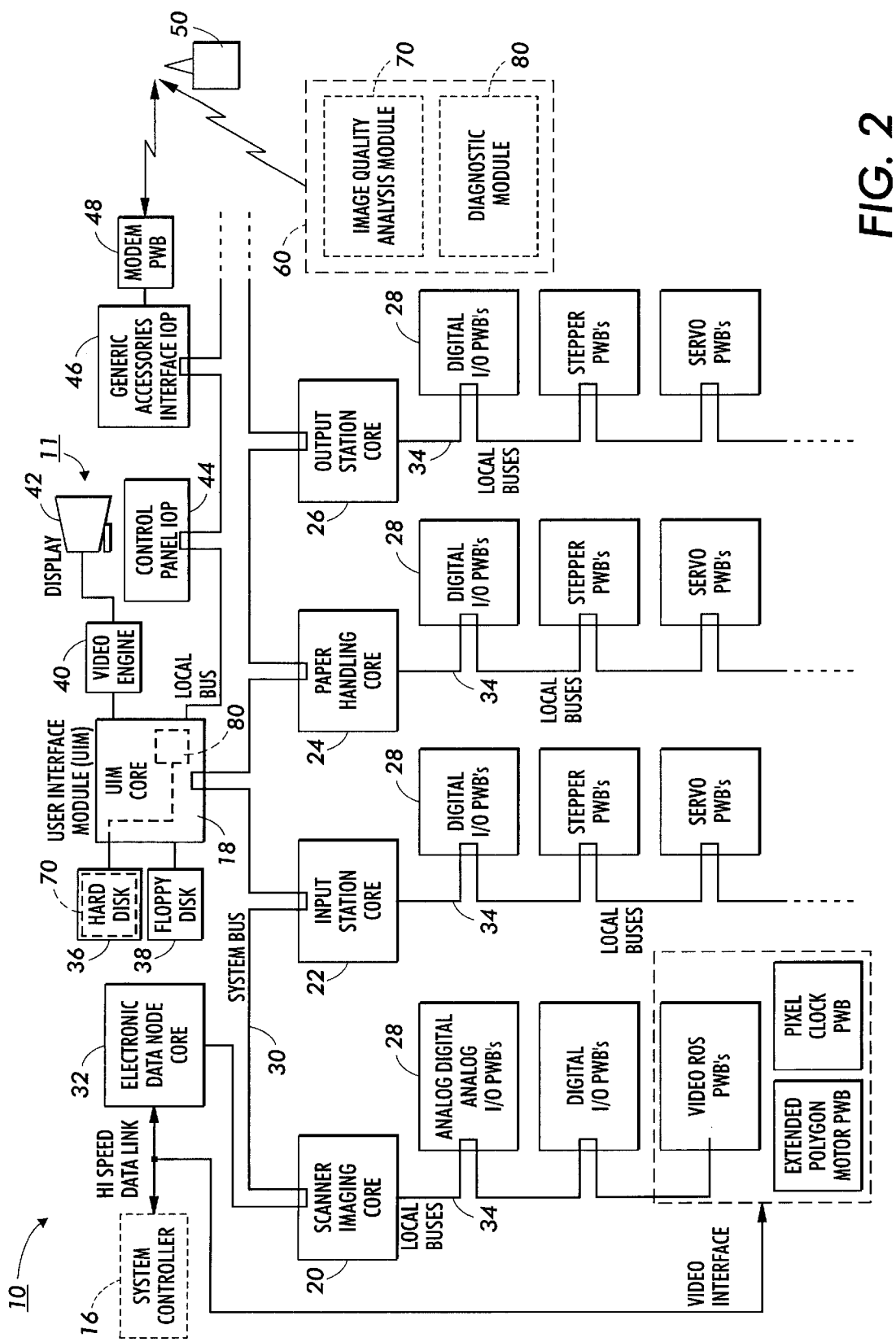
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
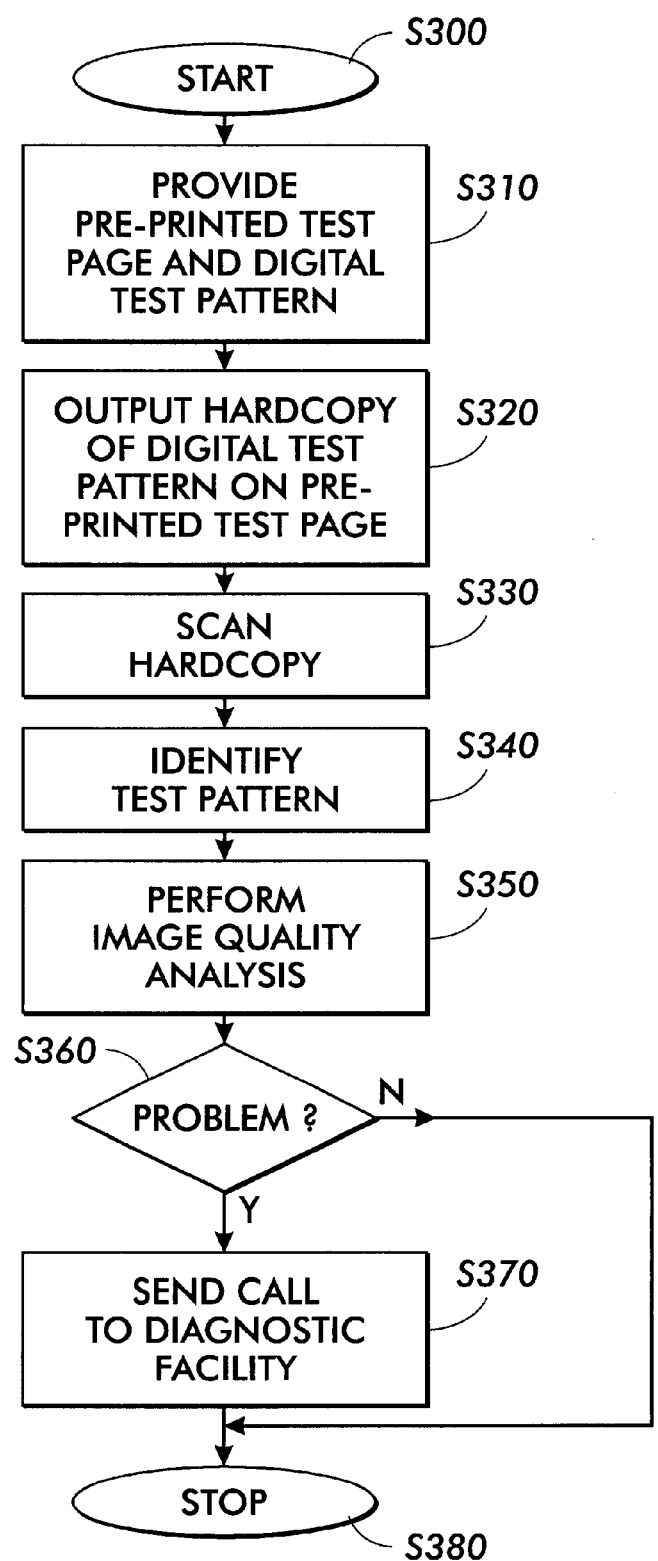
FIG. 3 is a flow chart showing an image analysis method according to the invention.
Figure 4A:
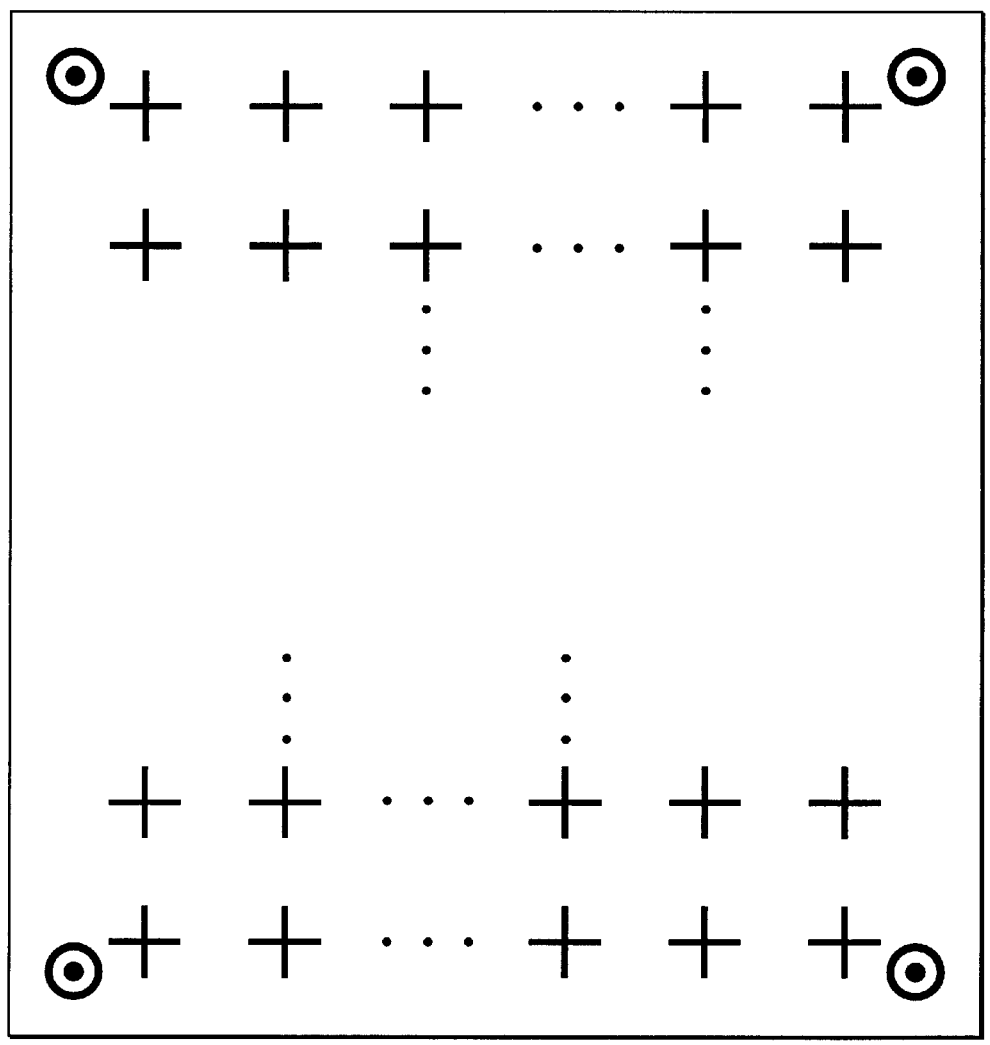
FIG. 4A is an exemplary pre-printed test pattern used by the invention.
Figure 4B:
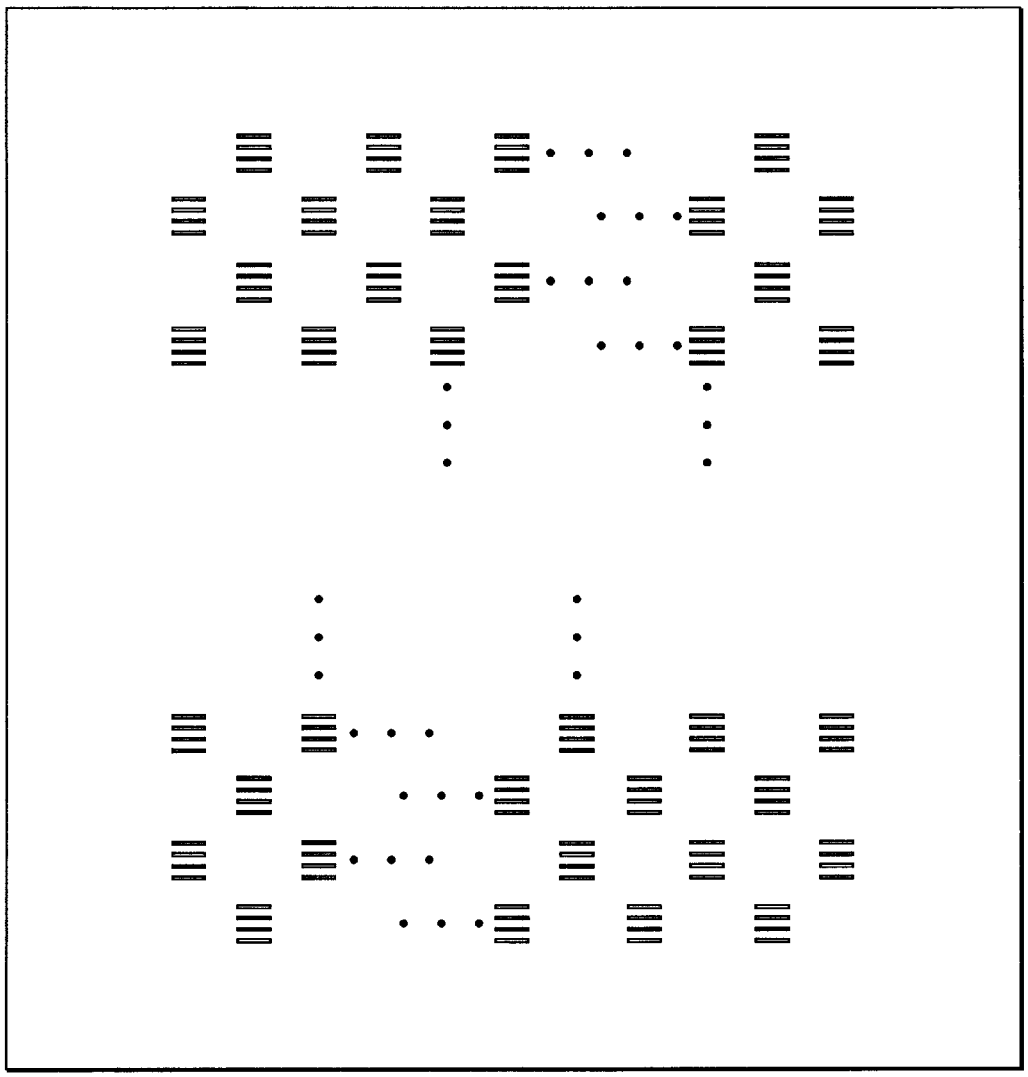
FIG. 4B is an exemplary digital test pattern used by the invention.
Figure 6:
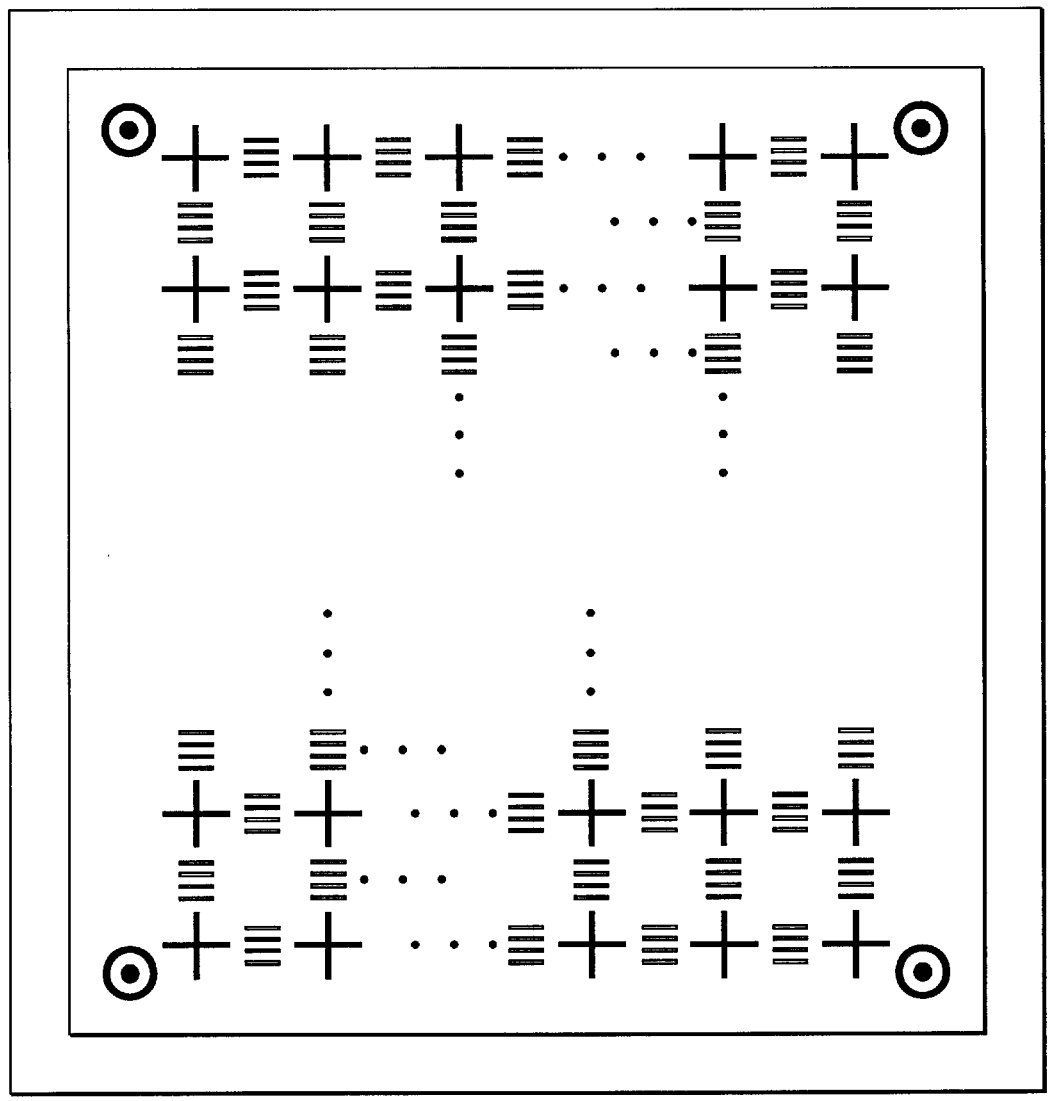
FIG. 6 is an exemplary output from the digital copier based on the digital test pattern of FIG. 4.

In a first embodiment of the invention, image quality analysis is performed by the process set forth in the flow chart of FIG. 3. The process starts at step S300 and advances to step S310 where at least one specific digital test pattern is provided. At least one specific pre-printed hardcopy test pattern is also provided. Exemplary digital test patterns and pre-printed test patterns are illustrated in FIGS. 4A and 4B, and will be described in more detail later. Preferably, multiple different test patterns are used to analyze various components relevant to a determination of image quality. Flow then proceeds to step S320 where a corresponding hardcopy output of the digital test pattern is generated on one of the pre-printed hardcopy test patterns. In the case of a digital copier, this can be done by placing the hardcopy original of the test pattern at scanner 20 and scanning it to form a digital test pattern, which can then be used as an input to output station 26 to form a hardcopy output. Regardless of whether the output device is a printer or a copier, the hardcopy output (FIG. 6) is generated on top of a pre-printed pattern instead of bare paper, such as the pre-printed page shown in FIG. 4A. Then, flow advances to step S330 where the hardcopy output is scanned by scanner 20 to form a digital raster image for analysis purposes.

After step S330, flow advances to step S340 where the digital raster image may be acted on by pattern recognition software, which can be located within hard disk 36 or removable storage 38 and is associated with image quality analysis module 70, to determine a precise location of various test elements within the scanned digital raster image. This software uses a Hough or similar transform to automatically detect locator marks on the image, such as the concentric rings provided on the four corners of the pre-printed test pattern of FIG. 4A. A suitable pattern recognition system for use with the invention can be found in U.S. Pat. No. 5,642,202 to Williams et al., owned by the assignee of the present invention, the disclosure of which is incorporated herein by reference in its entirety. Alternatively, or in conjunction therewith, the test pattern may include a script that signifies a particular test pattern. The copier machine 10 may have hardware/software to decipher the particular script embedded into the test pattern. The memory of the copier 10 may be provided with a file corresponding to each possible script detailing the contents of the script and associated test pattern, as well as detailing the particular image quality analysis routine to be used to measure a particular part of overall image quality. A more detailed description of such a scripted test pattern can be found in co-pending U.S. Ser. No. 09/450,182 to Rasmussen et al., filed concurrently herewith, entitled "Method to Allow Automated Image Quality Analysis of Arbitrary Test Patterns", the subject matter of which is incorporated by reference herein in its entirety.

After step S340, the process flows to step S350 where image quality analysis is performed on the test image using image quality analysis module 70. From step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be preferable for this call to be to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters. A specific preferable example of such a case when the copier 10 is provided with a diagnostic module is where flow always advances from step S350 to S370, such that the diagnostic facility makes the decision whether corrective action is necessary, basing that decision on both the image analysis and image quality measurements in conjunction with data from sensors and settings.

Figure 7:
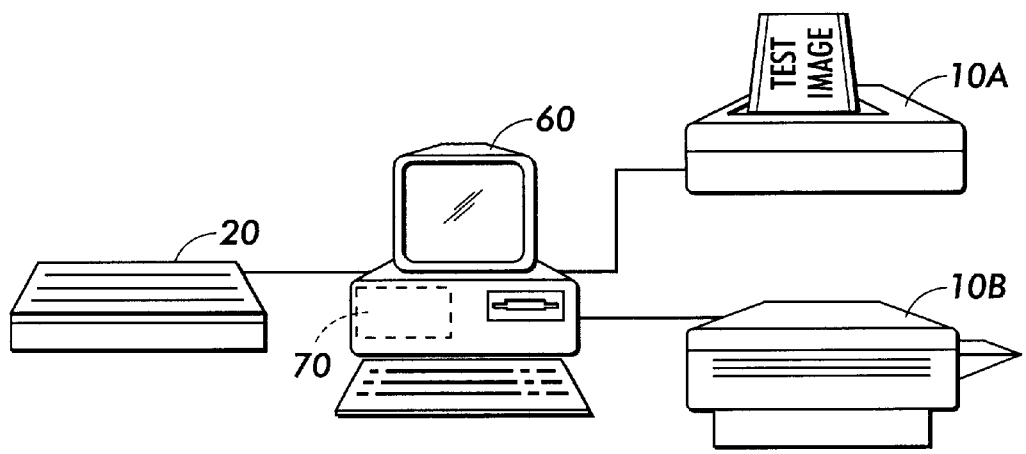
FIG. 7 is an alternative image output device and image analysis system according to the invention.

Alternatively, the image quality analysis module 70 may be remote from image output device 10. An example of which is illustrated in FIG. 7 where image output devices are in the form of two multi-functional printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a test pattern to generate a hardcopy output from. This hardcopy output is then placed in scanner 20 to generate the digital test image. This digital test pattern is then analyzed to determine image quality of the multi-function printer.

While shown in FIG. 7 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk and provided to a non-associated computer having the image quality analysis module.

At least two test patterns are needed for the invention, one of them digital and one of them pre-printed. These two test patterns are referred to as the "digital" and the "pre-printed", respectively. One suitable pre-printed test pattern is provided in FIG. 4A and consists of a page with a series of sharply-defined marks, such as crosses, distributed over the entire page at a predefined spacing, such as 10 mm increments in both directions. Alternatively, each of the two lines forming the crosses can be replaced by series of parallel lines, or other geometrical arrangement. The pre-printed test pattern also preferably contains two or more locator marks, such as the concentric rings provided at each corner. One suitable digital test pattern is provided in FIG. 4B and consists of a page with a series of sharply-defined marks, such as parallel line segments, distributed over the entire page such that they are interspersed between the crosses of the pre-printed test pattern. The four line segments in each location, shown in FIG. 4A, are appropriate for a process color output device with four primaries. In the case of a monochrome output device, there would be only one line segment in each location, and in the case of a highlight-color output device, there would be two or more line segments in each location.

Figure 5:
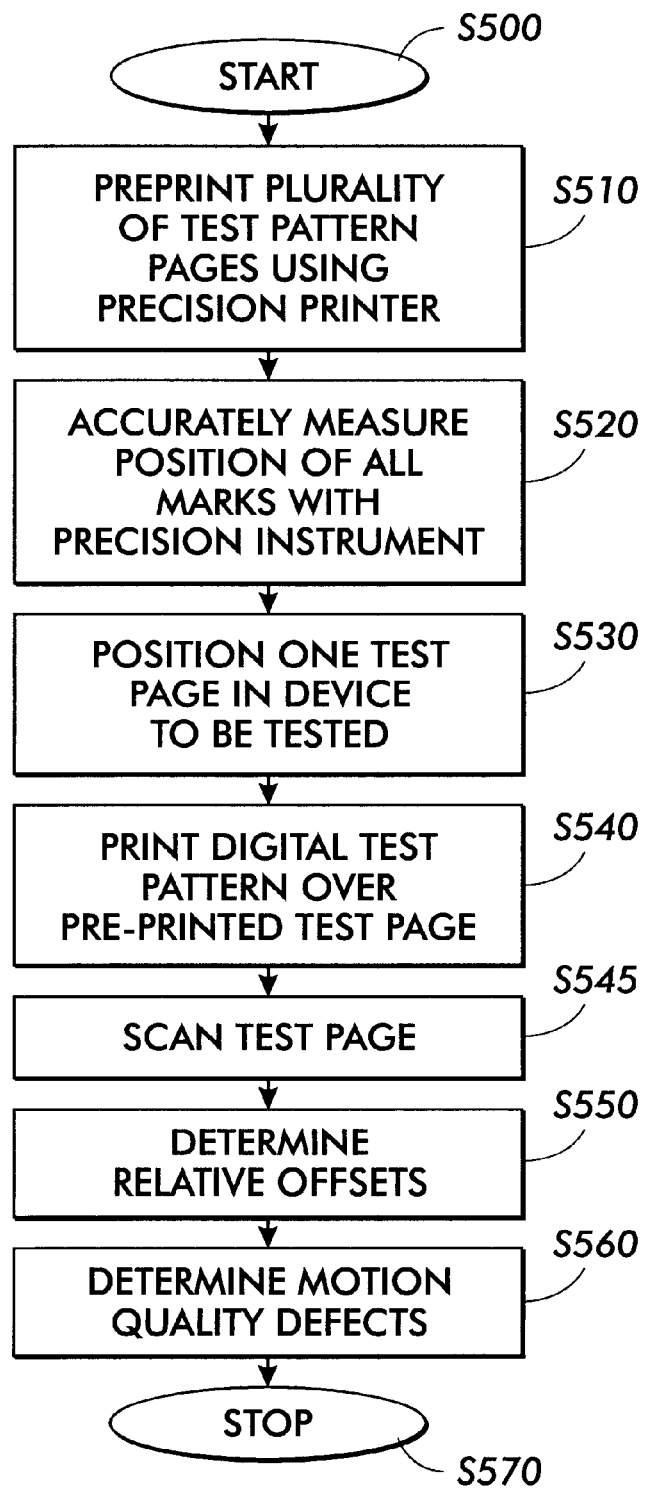
FIG. 5 is a flow chart showing a process of preparing pre-printed and measured test sheets and using them in image quality analysis according to the invention.

A process of determining motion quality using such a test pattern will be described with reference to FIG. 5. The process starts at step S500 and advances to step S510 where a plurality of test pages are printed on a desired substrate using a high-accuracy printer, such as a web-fed offset press. The marks are preferably made to cover the entire page. The exact placement of these marks is not critical, but it is highly desirable that the placement at least be accurately repeated on every test page. Once the plurality of test pages are printed, the process advances to step S520 where the marks on at least a predetermined number of the test pattern pages are tested using precise measuring instruments, such as a scanning microdensitometer, to accurately measure the location of all of the marks relative to the page. If the measurements are highly repeatable, then it can safely be assumed that the entire batch of test pages will have the same relative positions for each mark. However, if it is not repeatable, each test page needs to be individually measured.

Then, flow advances to step S530 where one of the pre-printed test pages (FIG. 4A) is fed into the paper path of the multi-function copier/printer whose MQ is being evaluated. This part of the analysis is performed on site. Data from the digital test pattern (FIG. 4B) is then used by the printer/copier in step S540 to output a series of matching marks superimposed on the pre-printed test page, which matching marks should be nominally lined up with the pre-printed marks. An illustrative example of such is provided in FIG. 6.

From step S540, flow advances to step S545 where the printer's hardcopy output, containing both the pre-printed marks and the printer's marks, is then scanned on a flat bed scanner, which can be the integral scanner provided in the multi-function copier/printer. From step S545, flow advances to step S550 where relative offsets between the pre-printed and subsequent marks are measured. This can be achieved, for example, in a manner similar to that used for color-color registration in co-pending U.S. Ser. No. 09/450, 181 to Rasmussen et al., filed concurrently herewith, the subject matter of which is incorporated by reference herein in its entirety. Many flat bed scanners have poor positional accuracy over long range, but excellent positional accuracy over short range. However, since the relative offsets between the pre-printed and subsequent marks are likely to be on the order of 1 mm or less, they can be accurately measured with flat bed scanners. From step S550, flow advances to step S560 where these relative offsets can be converted to position on the page because the exact position of the pre-printed marks is known. From these flat bed scanner measurements, one can extract quantitative information on motion quality errors, as well as position of the entire page relative to the paper. The process then stops at step S670.

Thus, with the invention, motion quality defects can be extracted using a rather low-quality scanner, preferably the scanner of the machine being tested so that on-site analysis can be performed.

The present invention has been described with reference to specific embodiments, which are intended to be illustrative and non-limiting. Various modifications can be made to the invention without departing from the spirit and scope of the invention as defined by the appended claims.

What is claimed is:

1. A method of performing image quality analysis on an image output device having an output station that generates a hardcopy color image output from an input image, the method comprising:

providing the image output device with at least one pre-printed hardcopy test pattern page having pre-printed marks that have been accurately measured in advance;

generating a hardcopy image output from the image output device using a digital test pattern as an input image having marks that match those on the pre-printed hardcopy test pattern page, the hardcopy image being generated on one of the at least one pre-printed test pattern page;

scanning the hardcopy image to form a digital raster image; and performing image quality analysis on the digital raster image, including determination of motion quality defects based on a comparison of the accurately measured pre-printed marks and the generated hardcopy image corresponding to the digital test pattern.

2. The method of claim 1, wherein the step of scanning uses a scanner of the image output device.

3. The method of claim 2, wherein the step of performing image quality analysis includes:

determining relative offsets between the pre-printed marks and the hardcopy image; and converting the offsets to positions on the page using the pre-measured exact positions of the pre-printed marks to extract quantitative information on motion quality errors.

4. The method of claim 1, wherein the image output device is a copier.

5. The method of claim 1, further comprising a step of measuring the pre-printed marks on the hardcopy test pattern page using a scanning microdensitometer.

6. The method of claim 1, wherein the step of scanning uses a flat bed scanner.

7. The method of claim 1, wherein the pre-printed marks are spaced by a predetermined uniform or variable spacing and cover substantially the entire page.

8. The method of claim 7, wherein the uniform spacing is about 10 mm.

9. An image quality analysis system for performing image quality analysis on an image output device, the system comprising:

at least one preprinted test page having a plurality of accurately measured marks extending over a substantial part of the page;

a digital test pattern with marks matching those on the preprinted test page;

an output station of the image output device that generates a hardcopy image corresponding to the digital test pattern, the hardcopy image being output on the at least one pre-printed test page;

a scanner that forms a digital raster image from the hardcopy image output from the image output device; and an image quality analysis module that performs image quality analysis on the digital raster image, including determination of motion quality defects based on a comparison of the accurately measured pre-printed marks and the generated hardcopy image corresponding to the digital test pattern.

10. The system of claim 9, wherein the scanner is part of the image output device.

11. The system of claim 10, wherein the image quality analysis module includes means for determining relative offsets between the pre-printed marks and the hardcopy image and means for converting the offsets to positions on the page using the pre-measured exact positions of the pre-printed marks to extract quantitative information on motion quality errors.

12. The system of claim 9, wherein the image output device is a copier.

13. The system of claim 9, wherein the scanner is an independent flat bed scanner.

14. The system of claim 9, wherein the accurately measured marks are spaced by a predetermined uniform or variable spacing and cover substantially the entire page.

15. The system of claim 14, wherein the spacing is uniform and about 10 mm.

* * * * *